(12) United States Patent
Knutsen et al.

(10) Patent No.: US 11,351,942 B2
(45) Date of Patent: Jun. 7, 2022

(54) STEP BUMPER WITH LOAD SUPPORT ON TRUCK FRAME

(71) Applicant: Toyota Motor Engineering & Manufacturing North America, Inc., Plano, TX (US)

(72) Inventors: Jeffrey S. Knutsen, Ann Arbor, MI (US); Matthew A. Jansma, Saline, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 94 days.

(21) Appl. No.: 16/867,210

(22) Filed: May 5, 2020

(65) Prior Publication Data

US 2021/0347318 A1 Nov. 11, 2021

(51) Int. Cl.
*B60R 19/48* (2006.01)
*B60R 19/24* (2006.01)

(52) U.S. Cl.
CPC ............. *B60R 19/48* (2013.01); *B60R 19/24* (2013.01)

(58) Field of Classification Search
CPC .......... B60R 19/48; B60R 19/24; B60R 19/29
See application file for complete search history.

(56) References Cited

U.S. PATENT DOCUMENTS 9,932,005 B2  4/2018  Perucca et al.

FOREIGN PATENT DOCUMENTS

| CN | 106696875 A | 5/2017 |
|---|---|---|
| CN | 106882137 A | 6/2017 |
| CN | 207190979 U | * 4/2018 |
| EP | 1325840 A1 | 7/2003 |
| JP | H0930346 A | 2/1997 |
| JP | H0930347 A | 2/1997 |
| JP | 2002274299 A | 9/2002 |
| JP | 2009051247 | 3/2009 |
| JP | 2011088533 A | 5/2011 |
| JP | 2015040009 A | 3/2015 |
| JP | WO2015080037 A1 | 3/2017 |
| KR | 20030057867 A | 7/2003 |

\* cited by examiner

Primary Examiner — D Glenn Dayoan
Assistant Examiner — Melissa Ann Bonifazi
(74) Attorney, Agent, or Firm — Christopher G. Darrow; Darrow Mustafa PC

(57) ABSTRACT

A vehicle bumper assembly includes a single-piece sub-frame having at least one step portion. The sub-frame is structured to be mountable on an extended portion of a vehicle frame so that the at least one step portion resides directly above the portion of the vehicle frame.

7 Claims, 5 Drawing Sheets

US 11,351,942 B2

STEP BUMPER WITH LOAD SUPPORT ON TRUCK FRAME

TECHNICAL FIELD

The present invention relates to vehicle bumper assemblies and, more particularly, to a bumper assembly mountable on a portion of a frame of a vehicle, to enable a vertical load exerted on the bumper assembly to be supported by the vehicle frame.

BACKGROUND

Bumper assemblies may be mounted to an end of a vehicle frame and may be structured for absorbing horizontally-acting forces due to impacts from other vehicles or objects in the environment of the vehicle. However, such bumpers may be less effective in supporting vertical loads applied to the bumper. Such bumper assemblies may also incorporate a metal covering which acts as an exoskeleton to generally strengthen the bumper against impacts and other loads. However, the metal covering also adds weight to the bumper.

SUMMARY

In one aspect of the embodiments described herein, a vehicle bumper assembly includes a single-piece sub-frame having at least one step portion. The sub-frame is structured to be mountable on a portion of a vehicle frame so that the at least one step portion resides directly above the portion of the vehicle frame.

DETAILED DESCRIPTION

Figure 1:
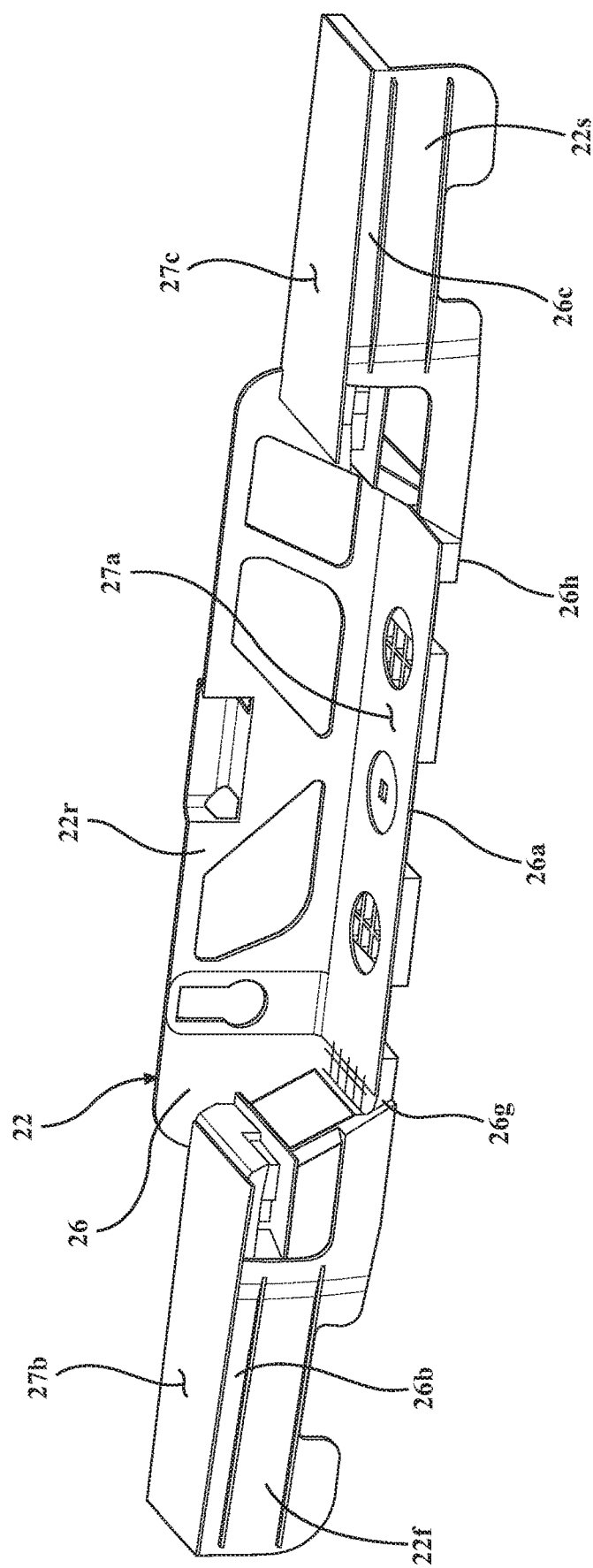
FIG. 1 is a schematic perspective view of a portion of a single-piece sub-frame incorporated into a vehicle bumper assembly in accordance with an embodiment described herein, shown with another portion of the sub-frame removed to illustrate interior features of the sub-frame.

Embodiments described herein relate to a vehicle bumper assembly having a single-piece sub-frame with at least one step portion, the sub-frame being structured to be mountable on an extended portion of a vehicle frame so that the at least one or more step portions reside directly above the portion of the vehicle frame. Each step portion may have a reinforcing member molded therein to increase the strength of the step portion for supporting vertical loading caused by a user stepping on the step portion. The bumper assembly may be structured so that each step portion of the bumper assembly may reside directly above the extended portion of the frame so that the portion of the frame supports the vertical load on the bumper assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 5:
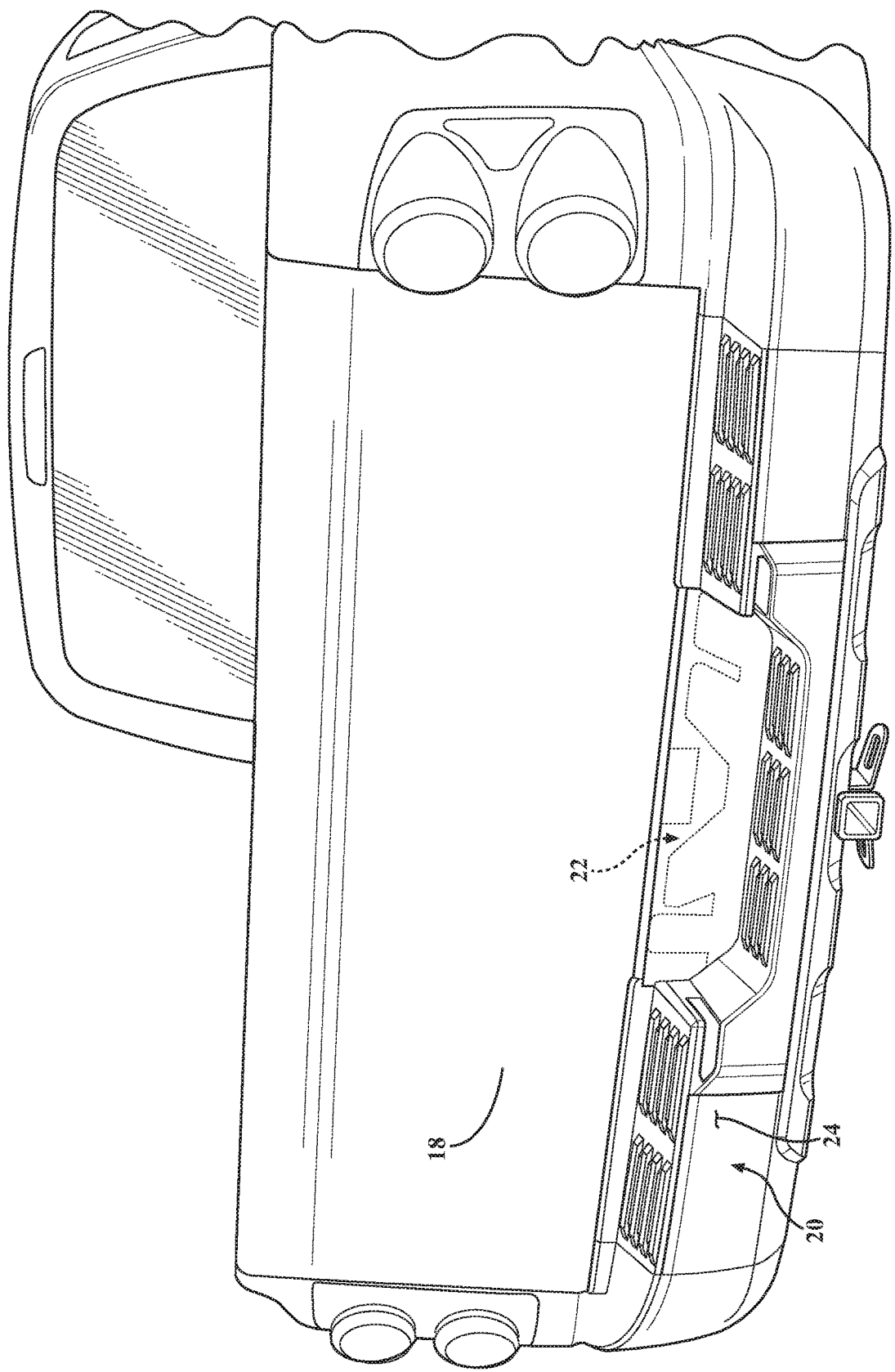
FIG. 5 is a schematic perspective view of a completed bumper assembly including the sub-frame and the attached fascia mounted on the portion of the vehicle frame shown in FIG. 3, where the frame is part of a pickup truck.

FIG. 1 is a schematic perspective view of a single-piece sub-frame 22 structured to be incorporated into a vehicle bumper assembly 20 (FIG. 5) in accordance with an embodiment described herein. In this view, an upper section of the polymer from which the sub-frame is molded has been removed to more clearly show interior features of the sub-frame, such as reinforcing members 27 described herein. The vehicle bumper assembly 20 may include the sub-frame 22 and a fascia 24 (shown in FIG. 5) secured to the sub-frame. The vehicle bumper assembly 20 may be structured to be mountable on a portion 19a of a frame 19 (FIG. 3) of a vehicle 18 so as to reside directly above the portion 19a of the vehicle frame. The portion 19a of the frame may be an extended portion of the frame 19 which extends from a main portion of the frame past an end of a body of the vehicle supported by the frame 19, for purposes of supporting the bumper assembly 20. The vehicle 18 may be a truck, such as a pickup truck, or the vehicle may be another type of vehicle having a frame suitable for supporting the bumper assembly as described herein. In one example, the portion 19a of the vehicle frame on which the bumper assembly 20 is mounted and supported may extend along a rear portion of the vehicle 18 (as shown in FIG. 5, for example). As reflected in its structure and it mounting position on the vehicle 18 as described herein, the vehicle bumper assembly 20 may be structured to support vertical loads caused by a user stepping onto a portion of the bumper assembly 20, rather than resisting or absorbing impact forces due to collisions with other vehicles or objects in the vehicle environment.

Referring to FIG. 1, in one or more arrangements, the sub-frame 22 may include a polymeric base 26 having at least one step portion 26a formed therealong. The embodiment shown in the drawings includes three step portions 26a, 26b, 26c. Step portions 26a, 26b, 26c may be structured to support a vertical load produced by a user stepping onto the bumper assembly 20. Each step portion 26a, 26b, 26c may be structured to reside directly above the portion 19a of the vehicle frame when the bumper assembly is mounted on the portion 19a of the vehicle frame 19. The sub-frame 22 may be molded from any polymer material suitable for the purposes described herein. In one or more arrangements, the sub-frame 22 may be molded from a glass fiber reinforced material to enhance strength and durability.

In one or more arrangements, and as seen in FIGS. 1, 2, 4, and 5, the sub-frame 22 may have a central step portion 26a, a first side step portion 26b coupled to the central step portion 26a along a first end 26g of the central step portion 26a, and a second side step portion 26c coupled to the central step portion 26a along a second end 26h of the central step portion 26a opposite the first side 26g. The first side step portion 26b may be structured to be vertically higher than the central step portion 26a when the bumper assembly 20 is mounted on the portion 19a of the vehicle frame 19. Similarly, the second side step portion 26c may be structured to be vertically higher than the central step portion 26a when the bumper assembly 20 is mounted on the portion 19a of the vehicle frame 19. Structural features such as waffle or lattice-shaped cutouts may be incorporated into the sub-frame step portions 26a, 26b, 26c to reduce weight while enhancing rigidity and durability.

To add strength and rigidity to the sub-frame 22, a rear wall portion 22r may extend from the central step portion 26a and may be connected at opposite ends thereof to the first side step portion 26b and the second side step portion 26c. Also, to provide additional strength and rigidity to the sub-frame 22, a front wall portion may extend from each of the first side step portion 26b and the second side step portion 26c. A first front wall portion 22f may extend from the first side step portion 26b and may be connected to the first end 26g of the central step portion 26a. A second front wall portion 22s may extend from the second side step portion 26c and may be connected to the second end 26h of the central step portion 26a. In one or more arrangements, the central step portion 26a, first and second side step portions 26b, 26c, rear wall portion 22r, and first and second front wall portions 22f, 22s may be integrally molded as a single piece during the sub-frame base portion molding process.

Each of step portions 26a, 26b, 26c may have a reinforcing member 27 positioned therein to help strengthen and rigidify the step portion. In one or more arrangements, a reinforcing member 27a, 27b, 27c may be insert molded into or onto each of step portions 26a, 26b, 26c, respectively. In one or more arrangements, the reinforcing members 27a, 27b, 27c may be metallic reinforcing members in the form of steel plates. The reinforcing members 27a, 27b, 27c may aid in supporting vertical loads produced by a user stepping onto the step portions 26a, 26b, 26c.

In one or more arrangements, each reinforcing member 27a, 27b, 27c may be structured to be supported (directly or indirectly) by the portion 19a of the vehicle frame 19 when the bumper assembly 20 is mounted on the portion 19a of the vehicle frame 19. For example, reinforcing members 27b, 27c molded into the first and second side step portions 26b, 26c may be supported by associated ones of mounting brackets 30a, 30b and 30c, 30d (FIG. 3) mounted on the portion 19a of the vehicle frame 19, which may support portions of the sub-frame 22 into which the reinforcing members 27a, 27b, are molded. Similarly, central step portion reinforcing member 27a may be supported by the portion 10a of the frame 19 residing under the portion of the sub-frame 22 into which the central step portion reinforcing member 27a is molded.

In one or more arrangements, each of reinforcing members 27a, 27b, 27c may be structured to reside directly above the portion 19a of the vehicle frame 19 when the bumper assembly 20 is mounted on the portion 19a of the vehicle frame 19.

In one or more arrangements, each of reinforcing members 27a, 27b, 27c may be incorporated into the structure of the sub-frame 22 so that no portion of the reinforcing member is exposed to direct contact or a direct loading applied, for example, by a user stepping onto a step portion of the sub-frame 22. In this respect, the reinforcing member(s) members 27a, 27b, 27c may form an endoskeletal structure strengthening and rigidifying the sub-frame 22.

In one or more arrangements, each of reinforcing members 27a, 27b, 27c may be incorporated into the structure of the sub-frame 22 so that no part of the reinforcing member is visible from an exterior of the sub-frame 22.

Figure 2:
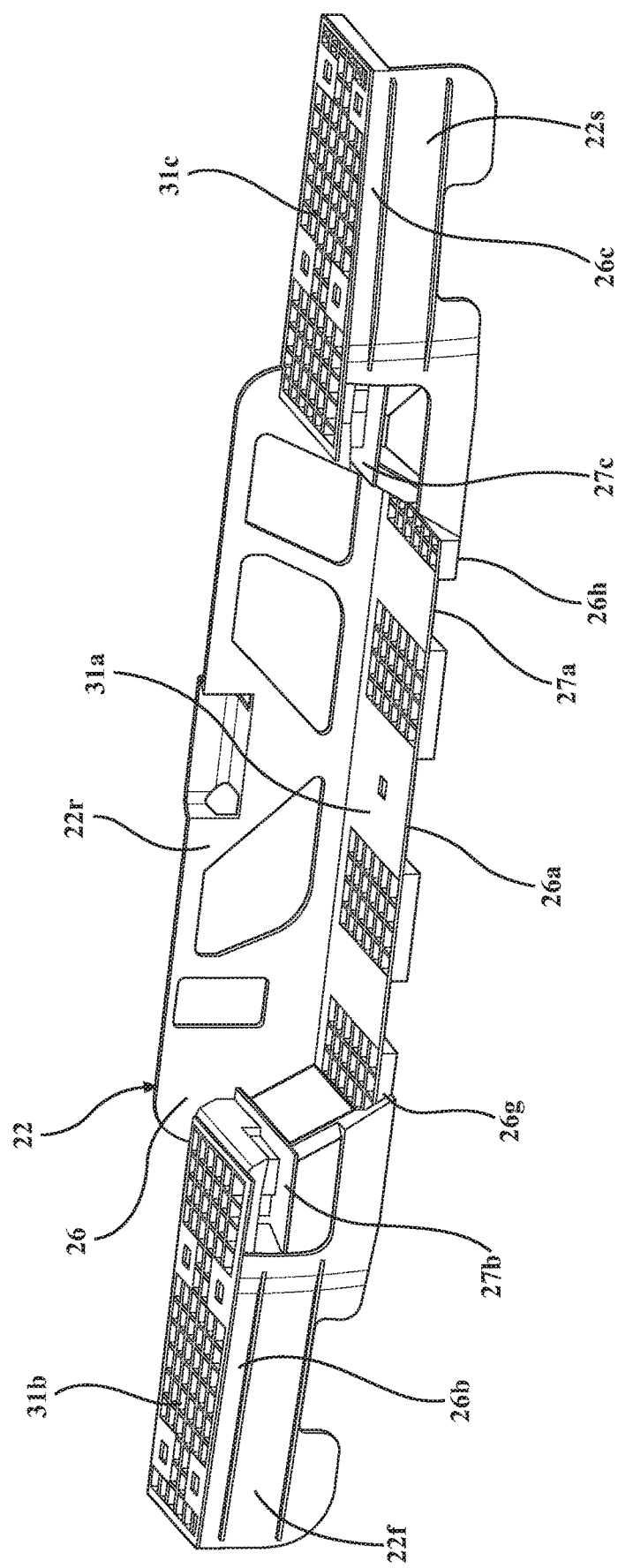
FIG. 2 is the schematic perspective view of FIG. 1 showing the complete sub-frame in an as-molded condition.

FIG. 2 is the schematic perspective view of FIG. 1 showing the complete sub-frame 22 in an as-molded condition. The sub-frame 22 may include step cover portions 31a, 31b, 31c extending along upper surfaces of the reinforcing members 27a, 27b, 27c. Step portion cover portions 31a, 31b, 31c may be molded over respective ones of the reinforcing members 27a, 27b, 27c as part of the molding the single-piece sub-frame, or the cover portions 31a, 31b, 31c may be formed separately from the sub-frame 22 and attached to the sub-frame or step portions 26a, 26b, 26c using fasteners, adhesives, etc.

Referring to FIG. 5, a polymeric fascia 24 may be attached to the sub-frame 22 for purposes of appearance and aerodynamics, and to cover any electrical and/or mechanical components incorporated into the sub-frame. The fascia 24 may be formed from any suitable material.

Because the sub-frame 22 is molded from a polymer material, receptacles and attachment features for various components and sub-assemblies may be molded into the structure of the sub-frame. For example, elements (not shown) such as license plate lamp housings, bumper mounting brackets, a vehicle smart antenna module, a trailer tow connection, hitch ball supports, wiring harnesses, electrical components and related brackets and supports may be molded into the structure of the sub-frame 22.

Alternatively, some of the above-mentioned elements may be molded into the sub-frame 22 and some of the elements may be molded into the fascia 24 for later attachment to the sub-frame. In other arrangements, features enabling location and/or attachment of any of the above-mentioned elements to the sub-frame 22 may be molded into the structure of the sub-frame 22.

Figure 3:
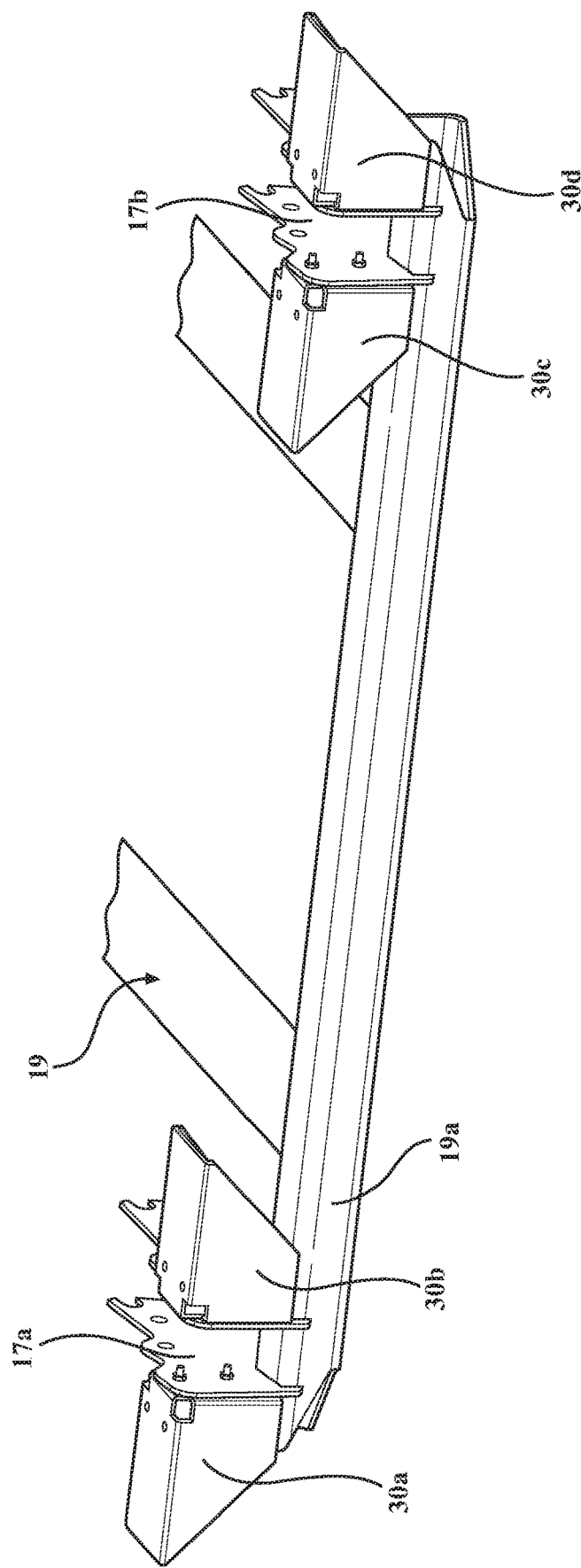
FIG. 3 is a schematic perspective view of a portion of a vehicle frame to which the vehicle bumper assembly may be attached.
Figure 4:
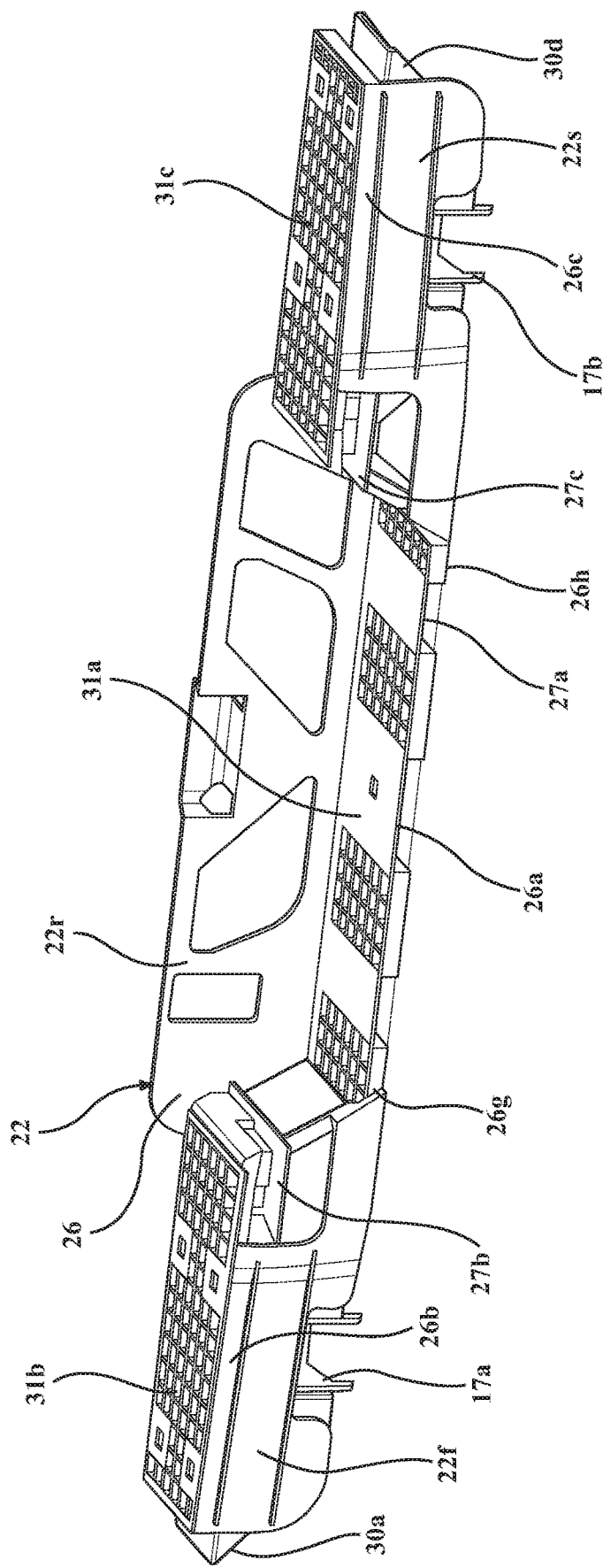
FIG. 4 is a schematic perspective view of the sub-frame of FIG. 2 mounted on the portion of the vehicle frame shown in FIG. 3.

FIG. 3 is a schematic perspective view of the portion 19a of the vehicle frame 19 to which the vehicle bumper assembly 20 may be attached. FIG. 3 shows portions 17a, 17b of a tow hitch attached to the vehicle frame 19 and mounting brackets 30a, 30b, 30c, 30d for the bumper assembly 20 attached to the portions 17a, 17b of the tow hitch. FIG. 4 is a schematic perspective view of the sub-frame 22 of FIG. 2 shown mounted on the portion 19a of the vehicle frame 19 shown in FIG. 3. FIG. 5 is a schematic perspective view of a completed bumper assembly 20 including the sub-frame 22 shown in FIGS. 3 and 4 and the attached fascia 24 mounted on the portion 19a of the vehicle frame 19 shown in FIG. 3, where the frame 19 is part of a pickup truck. The completed sub-frame 22 may be attached to the mounting brackets 30a, 30b, 30c, 30d and (optionally) directly to the portion 19a of the frame 19. The sub-frame 22 may be attached to the mounting brackets/sub-frame using bolts or any other suitable method.

Because it is mounted above the extended portion 19a of the vehicle frame 19, the bumper assembly 20 is not structured to absorb an impact load along an axis extending parallel with a ground surface, in the manner of a conventional bumper. Rather, the bumper assembly location is optimized to support a vertical load, with the mounting brackets 30a, 30b, 30c, 30d and the portion 19a of the vehicle frame acting to support vertical loads applied to the step portions 26a, 26b, 26c of the sub-frame 22. In addition, the bumper assembly may be assembled and transported separately from the remainder of the vehicle as a vehicle sub-assembly, and attached to the vehicle when desired.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle bumper assembly comprising a single-piece sub-frame having at least one step portion, the sub-frame being structured to be mountable on a portion of a vehicle frame so that the at least one step portion resides directly above the portion of the vehicle frame, wherein the sub-frame comprises a polymeric base including the at least one step portion, and wherein the at least one step portion has a reinforcing member molded therein and extending along an uppermost surface thereof.

2. The vehicle bumper assembly of claim 1 wherein the reinforcing member is structured to reside directly above the portion of the vehicle frame when the bumper assembly is mounted on the portion of the vehicle frame.

3. The vehicle bumper assembly of claim 1 wherein the sub-frame has a central step portion, a first side step portion coupled to the central step portion along a first side of the central step portion, and a second side step portion coupled to the central step portion along a second side of the central step portion opposite the first side.

4. The vehicle bumper assembly of claim 3 wherein each of the central step portion, the first side step portion, and the second side step portion has a reinforcing member molded therein and extending along an uppermost surface thereof.

5. The vehicle bumper assembly of claim 4 wherein each reinforcing member is structured to reside directly above the portion of the vehicle frame when the bumper assembly is mounted on the portion of the vehicle frame.

6. A vehicle comprising:
a vehicle frame having a portion extending past an end of a body of the vehicle; and
a vehicle bumper assembly comprising a single-piece sub-frame having at least one step portion, the sub-frame being mounted on the portion of a vehicle frame so that the at least one step portion resides directly above the portion of the vehicle frame.

7. The vehicle of claim 6 wherein the sub-frame comprises a polymeric base including the at least one step portion, and wherein the at least one step portion has a reinforcing member molded therein and extending along an uppermost surface thereof.

* * * * *